United States Patent
Crawford et al.

(10) Patent No.: US 6,864,788 B2
(45) Date of Patent: Mar. 8, 2005

(54) ACTUATOR CONTROLLER FOR SELECTING A COMMUNICATION LANGUAGE

(75) Inventors: Daniel A. Crawford, Burton, MI (US); Joyce D. Carsey, Swartz Creek, MI (US); Thomas E. Gyoergy, Clarkston, MI (US)

(73) Assignee: Delphi Technologies, Inc., Troy, MI (US)

( * ) Notice: Subject to any disclaimer, the term of this patent is extended or adjusted under 35 U.S.C. 154(b) by 255 days.

(21) Appl. No.: 09/923,053

(22) Filed: Aug. 6, 2001

(65) Prior Publication Data

US 2003/0028257 A1 Feb. 6, 2003

(51) Int. Cl.⁷ ................................................ G08B 1/00
(52) U.S. Cl. ........................ 340/531; 701/1; 701/36; 340/441; 340/425.5; 340/426.1; 340/531; 340/539; 340/993; 370/57; 370/58; 370/59; 370/60; 370/63
(58) Field of Search ...................... 700/2–3, 56, 282, 700/9–10; 340/441, 425.5, 426.1, 531, 539, 993, 57–60, 63; 701/1, 36; 710/11, 12; 709/310

(56) References Cited

U.S. PATENT DOCUMENTS

| | | | | | |
|---|---|---|---|---|---|
| 5,307,346 A | * | 4/1994 | Fieldhouse | .................. | 370/254 |
| 5,485,590 A | * | 1/1996 | Hyatt et al. | .................. | 711/115 |
| 5,491,418 A | * | 2/1996 | Alfaro et al. | ................ | 324/402 |
| 5,646,865 A | * | 7/1997 | Alfaro et al. | .................. | 701/29 |
| 5,796,607 A | * | 8/1998 | Le Van Suu | ................... | 700/11 |
| 5,842,039 A | * | 11/1998 | Hanaway et al. | ............. | 710/11 |
| 6,272,400 B1 | * | 8/2001 | Jankins et al. | ............. | 700/282 |
| 6,367,462 B1 | | 4/2002 | McKay et al. | ......... | 123/568.21 |
| 6,422,191 B1 | | 7/2002 | Braun et al. | ........... | 123/184.21 |
| 6,588,400 B2 | | 7/2003 | Gyoergy et al. | ............ | 123/399 |
| 6,654,351 B1 | * | 11/2003 | Casey | ........................ | 370/252 |
| 6,728,603 B2 | * | 4/2004 | Pruzan et al. | .................. | 701/1 |
| 2002/0110146 A1 | * | 8/2002 | Thayer et al. | ............. | 370/465 |

* cited by examiner

*Primary Examiner*—Anthony Knight
*Assistant Examiner*—Ronald D Hartman, Jr.
(74) *Attorney, Agent, or Firm*—Jimmy L. Funke

(57) ABSTRACT

An embodiment of the invention is an actuator controller for use in an actuator assembly. The actuator controller includes a processor for controlling an actuator associated with the actuator controller. A communication device is in communication with the processor. The communication device receives control commands from a master controller and is capable of communicating in multiple languages. A memory is accessible by the processor and the processor determines the language of the control commands and retrieves a control program from the memory corresponding to the language.

15 Claims, 2 Drawing Sheets

ACTUATOR CONTROLLER FOR SELECTING A COMMUNICATION LANGUAGE

BACKGROUND

Currently, actuators are used in vehicular applications such as heavy-duty diesel trucks, particularly in turbocharged and emission control systems. These actuators, referred to as remote smart actuators (RSA's), integrate a microprocessor-based electronic controller into a brushless motor/gear train/output shaft mechanism. The primary function of the RSA is to position an output shaft quickly and accurately as commanded by the vehicle's Engine Control Module (ECM). This action is then translated via linkage to the appropriate system actuator.

While many different RSA's are developed to perform similar functions, they often differ due to particular application requirements or due to varied manufacturer design. Therefore, although these actuators perform essentially the same function (with slight calibration differences), they often use different electronic communication methods to perform these functions. Some of these electronic communication methods or "languages" include control area network (CAN), pulse width modulation (PWM), Analog and universal asynchronous receiver/transmitter (UART) techniques.

The use of varied languages creates some complications when it comes to the testing and calibration of RSA's. The typical industry solution to this complication is to prepare a distinct software set for each different application. The nonvolatile memory of the RSA's microprocessor is loaded with a specific software set that conforms with "language" that works for that particular RSA in a particular application. Therefore, only after such special accommodations will the RSA be able to be calibrated, function, and tested properly. This invention allows for the functionality and testing of RSA's without recalibrating for a specific communications method.

SUMMARY

An exemplary embodiment of the invention is an actuator controller for use in an actuator assembly. The actuator controller includes a processor for controlling an actuator associated with the actuator controller. A communication device is in communication with the processor. The communication device receives control commands from a master controller and is capable of communicating in multiple languages. A memory is accessible by the processor and the processor determines the language of the control commands and retrieves a control program from the memory corresponding to the language.

The above described and other features are exemplified by the following figures and detailed description.

BRIEF DESCRIPTION OF THE DRAWINGS

Referring now to the Figures, which are meant to be exemplary and not limiting, and wherein like elements are numbered alike in the figures.

DESCRIPTION OF THE PREFERRED EMBODIMENT

Figure 1:
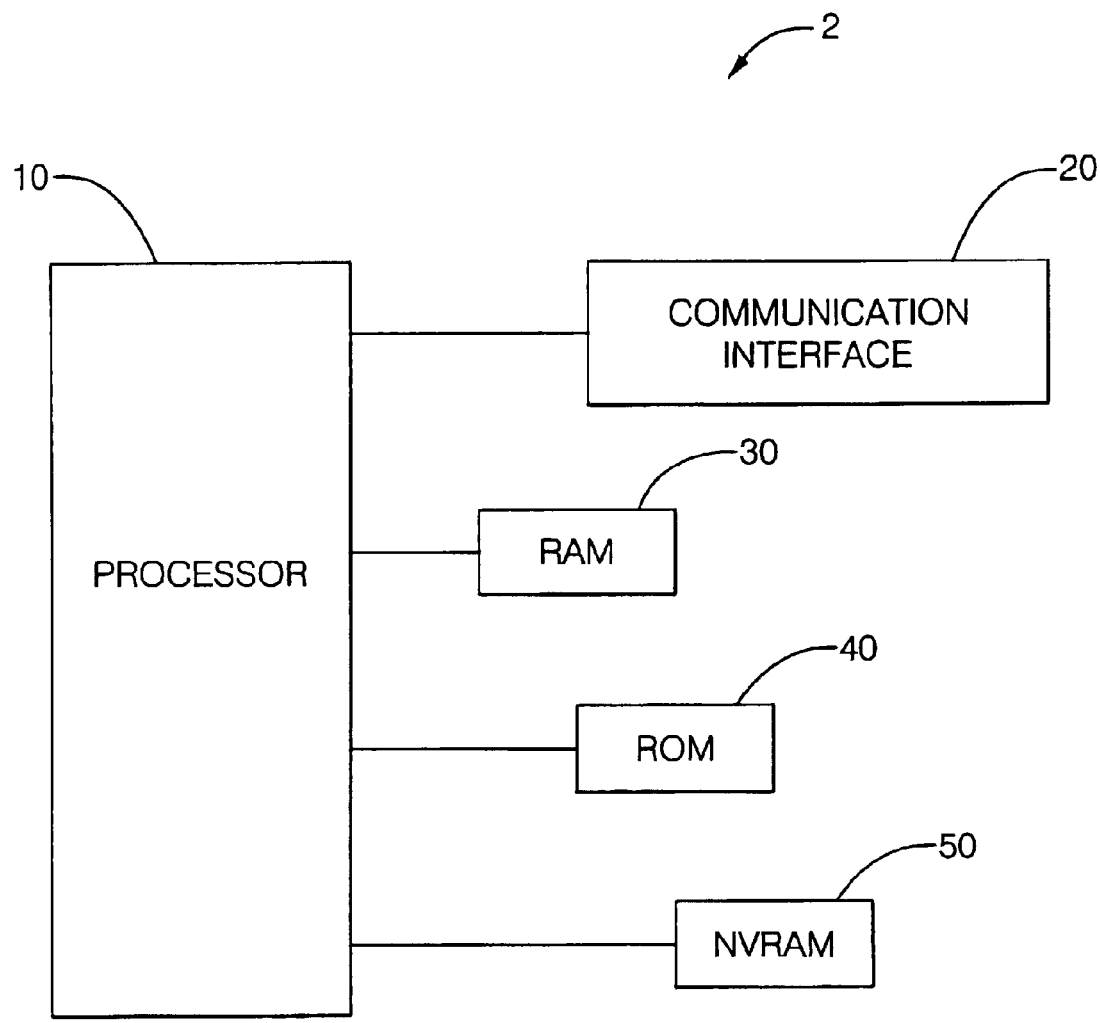
FIG. 1 is block diagram of an exemplary actuator controller.

FIG. 1 presents a basic representation of a controller 2 used to control and test an actuator. The controller 2 may be embedded along with the actuator in an actuator assembly. The controller 2 includes a processor 10 which may be implemented using existing microprocessors. A communication interface 20, which may include more than one type of communication input/output, provides for communication with a master controller such as an ECM. Commands for positioning the actuator are provided to controller 2 through communication interface 20. Control signals to the actuator may be sent over communications interface 20 or a separate I/O port. Memory devices such as random access memory (RAM) 30, read only memory (ROM) 40 and non-volatile random access memory (NVRAM) 50 are in communication with processor 10. It is understood that additional components (e.g., power supply, resistors, capacitors, etc.) may be associated with processor 10.

Initially, when an actuator assembly is assembled and initialized for its intended application, various parameters relating to that particular actuator assembly will be loaded into nonvolatile memory (NVRAM). For example, the actuator may be driven through its full range of operation in order to establish its "full close" and "full open" positions. Such positions define the full range of motion of the actuator. Positions within that range are then scaled into a percentage value based on those two fundamental positions. These parameters are stored as bytes in NVRAM for later use during operation and testing. Such information is used to calibrate the particular actuator being used, so that the system will execute commands that accurately translate into the intended behavior by the actuator. One calibration parameter relates to the communication format, referred to herein as the "language," being used to provide input/output to processor 10. The differences in languages can significantly affect the accurate translation of signals to and from the processor.

Additionally, as calibration parameters of many recognized or commonly used actuators are well known, such parameters can be preprogrammed into NVRAM 50. Thus, an actuator identifier, such as a part number or manufacturer code, may be used to designate which calibration parameters are loaded into NVRAM 50 at the time of initialization. The calibration parameters may include the communication language used for that actuator. This initialization technique can save time by providing information about the intended primary language for the chosen actuator. By knowing the intended primary or secondary language used for an actuator, signaling commands can be adjusted or calibrated so that it functions properly.

Figure 2:
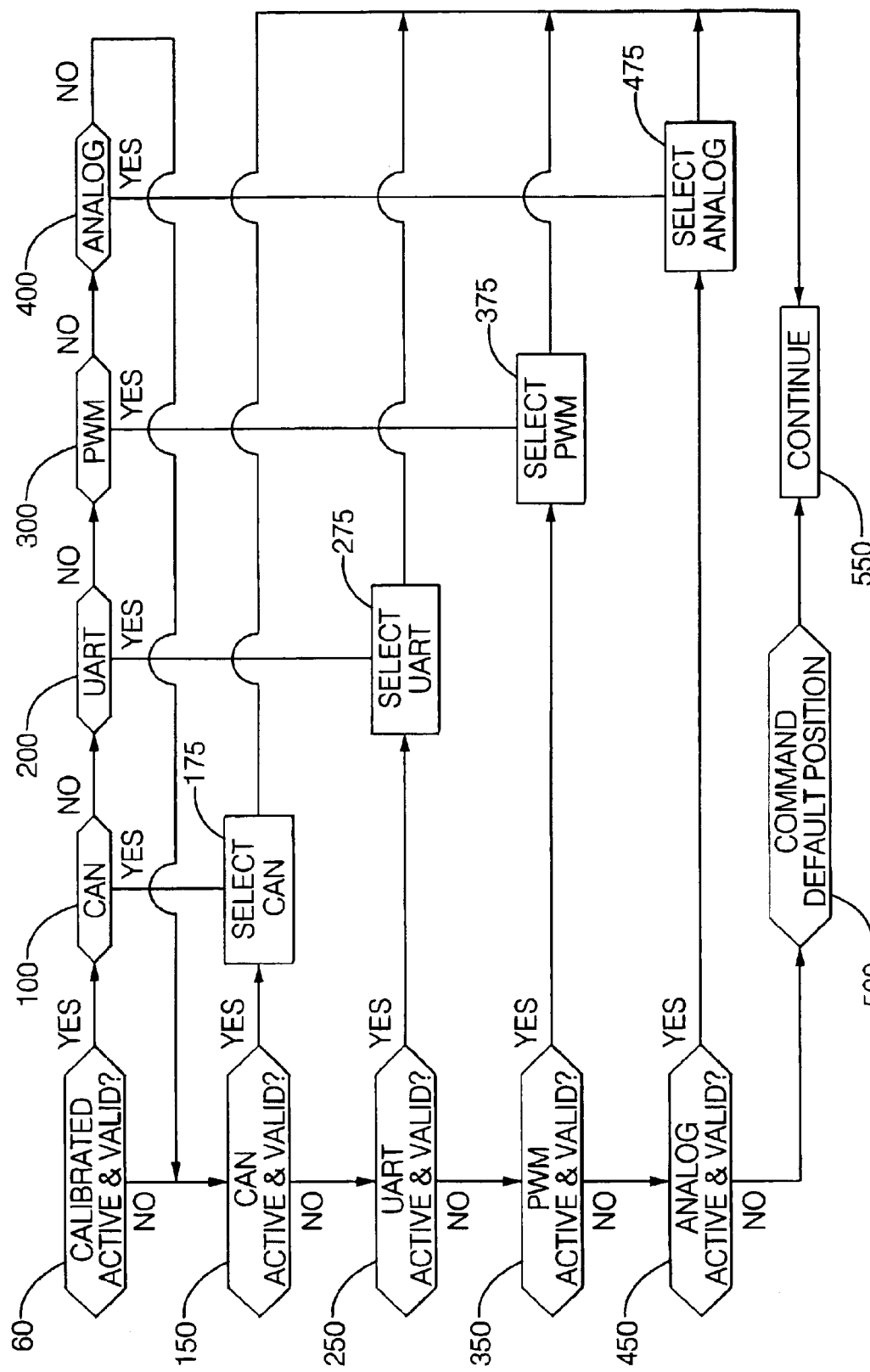
FIG. 2 is a flowchart of a process for determining a command source and selecting an appropriate language.

An exemplary embodiment of the invention provides a single software set that contains parameters for a variety of actuators and also provides a method so that the software initialized into NVRAM can identify which parameters to use. FIG. 2 depicts a process implemented by processor 10 in response to a computer program stored, for example, in NVRAM 50. To verify that the controller continually uses the proper parameters, the process as demonstrated in FIG. 2 may be repeated on a regular basis. For example, a preferred embodiment reiterates this procedure every 3 milliseconds.

Referring to FIG. 2, the process begins at step 60 where processor 10 checks for a calibrated source, and also checks whether that source is actively present in the system and generating proper values. Only a "yes" response to all of these questions will generate a "yes" for step 60. As discussed above, a calibrated source would be one that has been identified and registered in NVRAM 50 along with its parameters, or is predefined in NVRAM and identified by manufacturer code. If a calibrated source is identified, then the system will check whether that source is active. In other words, is processor 10 receiving signals from that control command source. Next, processor 10 confirms that the control commands are valid or consistent with expected values for that actuator. For example, if a control command was received that attempts to position an actuator beyond its intended range, such a value would not be valid. Only a positive response to all three questions in step 60 will generate a yes response, otherwise a no response is generated.

A positive response at 60 means that there has been a calibrated, active and valid control command detected. In such a case, steps 100, 200, 300 and 400 determine the language of the source control commands. Where an actuator has been calibrated, the language is typically known and may be identified by a language identifier stored in NVRAM 50. Processor 10 accesses the language data from NVRAM 50 to determine the appropriate control command language. Once the language is detected, processor 10 designates that mode of communication via communications interface 20 for accurate operations. Therefore, if processor 10 detects CAN language at step 100, the processor selects CAN communications at step 175. Likewise, detecting UART at step 200 leads to selection of UART communications at step 275, detecting PWM at step 300 leads to selecting PWM communications at step 375, and detecting analog at step 400 leads to selecting analog control at step 475. The application continues to step 550 and the cycle will run periodically (e.g., every 3 milliseconds).

A negative response to any of the questions presented in step 60 means that there either is no language identifier stored in NVRAM 50 or that there is a system malfunction. In such a scenario, the source language is detected by processor 10 in order to properly translate control commands. Thus, step 150 initiates a hierarchical test in order to determine which language to use. In particular, at step 150 the processor checks to determine if the CAN language being received and whether the signals being received are valid. Such a check can be done in various ways, such as verifying communication characteristics (e.g., headers, interrupts, framing errors, baud rate, and/or the addressing identification on the printed wiring board). Once again, the "active" aspect of the check relates to whether a CAN signal is being received, while the "valid" aspect relates to whether the signal is appropriate for the application. A positive response to both these questions will designate CAN as the command source language at step 175. Processor 10 then retrieves the corresponding CAN control program from NVRAM 50 so that the CAN control commands are properly processed by processor 10. A negative response to either of the questions at step 150 continues the hierarchical test for the next priority language.

At step 250, processor 10 determines if a UART signal is active and valid. A UART signal can be identified based on communication characteristics in much the same way as a CAN signal. The primary distinction between these two languages is the scaling. Due to the nature of a UART interface, an all "0" or all "1" byte value is not desirable. Therefore, an offset is provided in the scaling to avoid such values and have them result in a non-valid signal. Also, as with CAN, an active and valid UART signal will result in the selection of UART at step 275 as the command source language.

The next language checked is PWM at step 350 and then analog at step 450 if PWM is not present. Both languages may be detected based on known communication characteristics. Once again an active and valid signal from these sources will designate the corresponding language at steps 375 and 475, respectively. It should be noted that the actuator will be provided with what is referred to as a "duty cycle," when using PWM or analog communications due to generally accepted tolerances. A duty cycle will operate the actuator in a range, such as 5% to 95%. As with other predefined calibration parameters, the duty cycle parameters would be stored in NVRAM 50.

While FIG. 2 designates a particular priority for the languages that are considered, it is understood that a different order can be defined in the initialization software. What is more, the software may be provided with the capability of receiving configuration input in order to change the language priority used in the procedure described by FIG. 2. Certain changes to bit designations in NVRAM may perform this function. Also, some circuits do not allow analog communication. In order to deal with such cases, initial parameters may be set to make step 450 automatically fail, thus not allowing the selection of analog communications. Conversely, the initial parameters may be designed to not accept analog selection unless it has been specifically enabled in NVRAM.

Typically, only one source will be provided on any actuator in application. There may be applications where a secondary source will become available only if the primary source has failed.

Finally, in the event that all the tests 150, 250, 350, 450 discussed above fail, the system will direct the actuator into a command default position 500. Such a position would be stored in NVRAM as part of the initial calibration, and would be a signal to a tester or user that something is wrong with the system.

The ability of the controller to communicate in multiple formats simplifies the job of the application/system engineers by allowing them to read/write control information to/from any actuator assembly via UART regardless of the default communication programmed in NVRAM. The controller detects the UART communications as shown in step 200 and selects UART communications mode at step 275 as described above with reference to FIG. 2.

While preferred embodiments have been shown and described, various modifications and substitutions may be made thereto without departing from the spirit and scope of the invention.

What is claimed is:

1. An actuator controller for use in an actuator assembly, the actuator controller comprising:

a processor for controlling an actuator associated with the actuator controller;

a communication device in communication with said processor, said communication device receiving at least one control command indicative of a commanded operational position of said actuator from a master controller, said communication device capable of communicating in multiple languages defined by the master controller;

a memory accessible by said processor; and said processor accessing said memory to determine if a language identifier parameter is stored in said memory, said processor determining a language of said at least one control command based on said language identifier parameter if said language identifier parameter is stored in said memory, said processor determining said language of said control command in response to communication characteristics of said control command if said language identifier parameter is not stored in said memory.

2. The actuator controller of claim 1 wherein said language identifier parameter is stored in said memory upon calibration of said actuator.

3. The actuator controller of claim 1 wherein said processor is further configured to determine whether said communication device is receiving said at least one control command from said master controller.

4. The actuator controller of claim 3 wherein said processor is further configured to determine whether said at least one control command is a valid control command.

5. The actuator controller of claim 1 wherein said processor determining said language is performed repeatedly on a predetermined schedule.

6. The actuator controller of claim 1 wherein said language includes one of UART, CAN, PWM and analog communication techniques.

7. The actuator controller of claim 1, wherein said processor is further configured to induce an actuator shaft of said actuator to move to said commanded operational position based on said control command from said master controller.

8. The actuator controller of claim 1, wherein said master controller comprises an engine control module.

9. An actuator controller for use in an actuator assembly, the actuator controller comprising:
　a processor for controlling an actuator associated with the actuator controller;
　a communication device in communication with said processor, said communication device receiving at least one control command indicative of a commanded operational position of said actuator from a master controller, said communication device capable of communicating in multiple languages defined by said master controller; and,
　a memory accessible by said processor,
　said processor being configured to determine a language of the control command based on either a language identifier parameter stored in said memory or a communication characteristic of said control command, said processor retrieving a control program from said memory corresponding to said language if said processor determines said language, said processor generating a default command position for said actuator upon failing to determine said language.

10. A method of automatically selecting a language for use with an actuator controller, the method comprising:
　receiving at least one control command indicative of a commanded operational position of an actuator from a master controller;
　determining a language of the control command;
　and retrieving a control program corresponding to said language;
　wherein the step of determining said language includes:
　　accessing a memory to determine if an language identifier parameter is stored in said memory;
　　determining said language of the control command based on said language identifier parameter if said language identifier parameter is stored in said memory; and
　　determining said language in response to communication characteristics of said control command if said language identifier parameter is not stored in said memory.

11. The method of claim 10 further comprising determining active receipt of said at least one control command when determining said language.

12. The method of claim 11 further comprising determining if said control command is valid when determining said language.

13. The method of claim 10 further comprising repeatedly determining said language on a predetermined schedule.

14. The method of claim 10 wherein said language includes one of UART, CAN, PWM and analog communication techniques.

15. A method of automatically selecting a language for use with an actuator controller, the method comprising:
　receiving at least one control command indicative of a commanded operational position of an actuator from a master controller;
　attempting to determine a language of the control command based on either a language identifier parameter stored in a memory or a communication characteristic of said control command;
　retrieving a control program from the memory corresponding to said language if said language is determined; and
　generating a default command position for said actuator upon failing to determine said language.

\* \* \* \* \*